United States Patent

[11] 3,627,705

| [72] | Inventor | Albert William Kingsbury<br>Moorestown, N.J. |
|---|---|---|
| [21] | Appl. No. | 3,427 |
| [22] | Filed | Jan. 16, 1970 |
| [45] | Patented | Dec. 14, 1971 |
| [73] | Assignee | Sybron Corporation<br>Rochester, N.Y. |

[54] COUNTERCURRENT ION EXCHANGE REGENERATION WITH SULFURIC ACID
5 Claims, 1 Drawing Fig.

[52] U.S. Cl........................................................ 260/2.2 R,
23/285, 210/33
[51] Int. Cl....................................................B01d 15/06,
C02b 1/76
[50] Field of Search............................................ 260/2.2;
210/33

[56] References Cited
UNITED STATES PATENTS

| 2,572,848 | 10/1951 | Fitch............................ | 210/24 |
| 3,494,881 | 2/1970 | Ryan et al..................... | 260/2.2 |

FOREIGN PATENTS

| 1,033,224 | 6/1966 | Great Britain |

Primary Examiner—Melvin Goldstein
Attorney—Theodore B. Roessel

ABSTRACT: A method and apparatus for regenerating cation exchange resin which is partially in the calcium form wherein dilution water is injected to prevent the precipitation of calcium sulfate in the column when sulfuric acid is used as the regenerant.

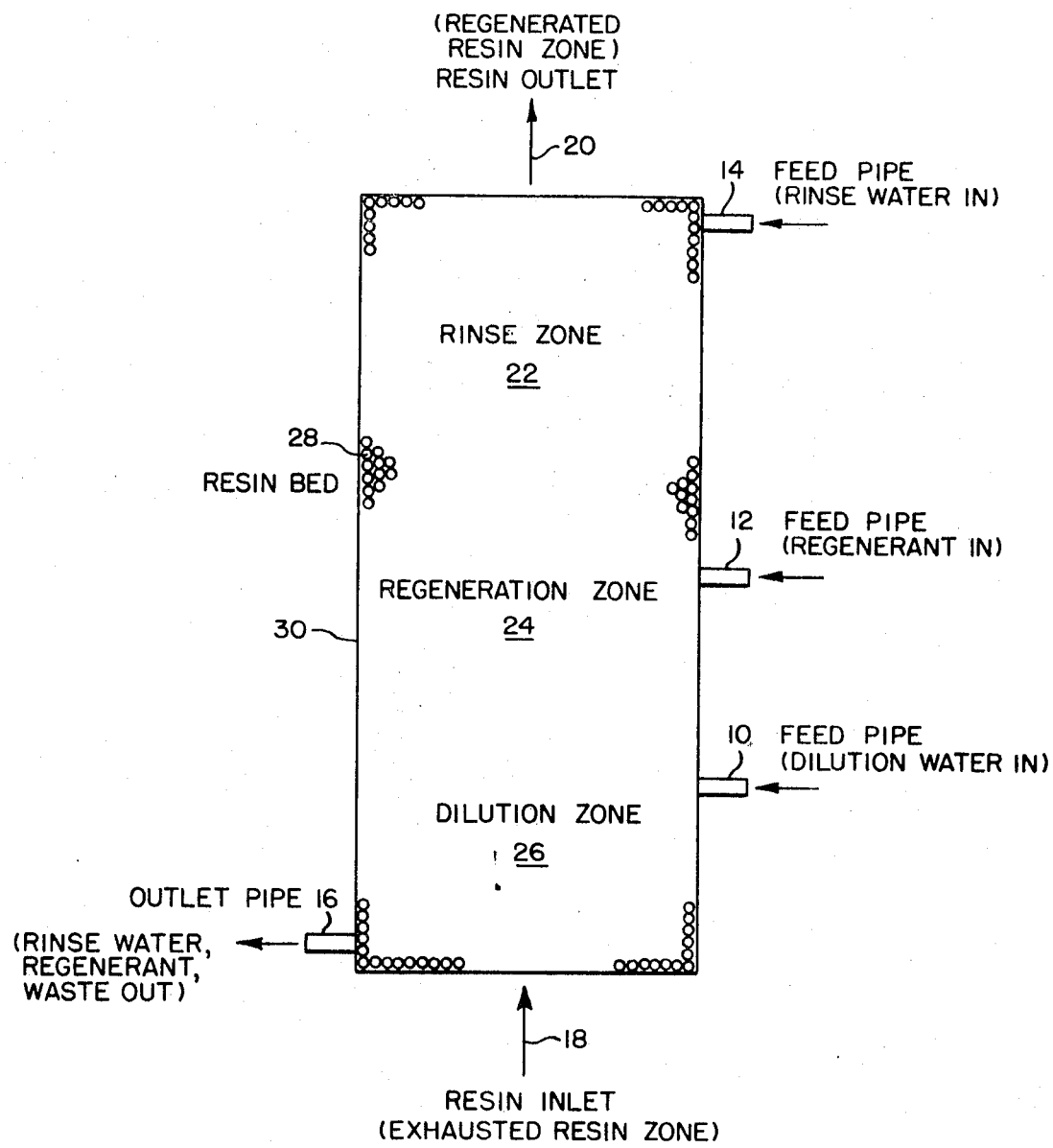

COUNTERCURRENT ION EXCHANGE REGENERATION WITH SULFURIC ACID

BACKGROUND OF THE INVENTION

This invention relates to a method and apparatus for treating cation exchange resin, and more particularly to a method and apparatus for regenerating cation exchange resin in the calcium form with sulfuric acid regenerant in a continuous countercurrent ion exchange system.

Acid regenerated cation exchange resins ordinarily remove such ions as sodium, calcium, magnesium and the like from water or other solutions subjected to demineralization, purification, or softening. When the cation exchange resin sites are exhausted, and ions are no longer removed from the solution under treatment, the cation exchange resin can be regenerated. This operation may be done by fixed bed systems or by a countercurrent ion exchange system.

A typical countercurrent ion exchange system usually consists of two stages in which the resin is contacted countercurrently with the exhausting stream and the regenerant stream. The resin as well as the solutions are usually made to flow through the system continuously or intermittently from one stage to another.

In the regeneration stage ion exchange resin is introduced at one end of the column and the regenerant is introduced at some intermediate point in the column in such a way that the flow of regenerant is countercurrent to the flow of resin. Rinse water is generally introduced at the other end of the column and also flows countercurrent to the flow of resin.

In countercurrent ion exchange systems, as in fixed bed systems, inorganic acids may be used for regeneration of cation exchange resin. In regenerating cation exchange resins, it is of advantage to use a high concentration of the inorganic acid, e.g., sulfuric acid, in order to obtain high regeneration efficiency. However, if the cation exchange resin being regenerated has an appreciable amount of calcium ion present, that is, if it is partially or completely in the calcium form, higher concentrations of sulfuric acid cannot be used because insoluble calcium sulfate precipitate will be formed as shown by the following chemical equation and will collect in the resin bed:

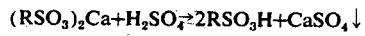

where R indicates the organic portion of the resin and $SO_3$ is the immobile portion of the ion active group.

One method which eliminates the precipitation problem, is the use of hydrochloric acid as the inorganic acid regenerant. Hydrochloric acid and the cation exchange resin in the calcium form will not form insoluble precipitates. However, hydrochloric acid is a very expensive inorganic acid, and its use as a regenerant is usually prohibited by such expense.

Another method of eliminating the precipitation problem when cation exchange resin in the calcium form is regenerated with sulfuric acid, is by the use of dilute sulfuric acid having a concentration of 2 percent (by weight) or less, depending on the concentration of calcium, in the resin, at the point of introduction into the column. Calcium sulfate is soluble at lower acid concentrations and will not precipitate out of solution. However, such a low concentration of sulfuric acid will not efficiently regenerate the cation exchange resin, and therefore, sulfuric acid having a concentration of less than 2 percent (by weight) is not generally suitable for regeneration.

Calcium sulfate precipitation may also be eliminated when somewhat higher concentrations of sulfuric acid are used, by adding enough rinse water to the column so that when the rinse water and the sulfuric acid combine, the concentration of the acid will be less than that required to cause precipitation of the calcium sulfate. However, this method is limited by the amount of rinse water which can be admitted to the system, and the concentration of sulfuric acid regenerant can be no greater than 1 to 2 percent (by weight) depending on the concentration of calcium in the resin when this method is utilized. Therefore, regeneration efficiency would still be too low.

Wilcox et al. in U.S. Pat. No. 2,528,099 teach a method and apparatus for ion exchange operations in which they collect cations, that is, positively charged ions such as calcium, sodium, etc. from the solution being treated. When the exchange capacity of the cation exchange resin is exhausted, Wilcox et al. regenerate the materials with a suitable strength mineral acid such as sulfuric acid to have their H-ion capacity restored. In such a system if any appreciable amount of calcium ion is present and the concentration of the sulfuric acid regenerant is greater than 1–2 percent (by weight) depending on the concentration of calcium in the resin, then calcium sulfate precipitate will be formed and will collect in the resin bed.

SUMMARY OF THE INVENTION

It has been found that when a stream of dilution water is introduced into the column of a countercurrent ion exchange system between the sulfuric acid regenerant inlet and the rinse water and spent acid outlet, calcium sulfate does not precipitate out of solution and collect in the resin bed even though the concentration of sulfuric acid before the point of dilution exceeds the concentration which generally causes precipitation. The dilution water added to the column at a point below the sulfuric acid inlet dilutes the sulfuric acid below the point at which calcium sulfate precipitates. Thus, most of the calcium is removed from the cation exchange resin below the point of dilution water addition. When the resin passes by means of countercurrent motion beyond the point of dilution water addition, it comes in contact with acid of a higher concentration which regenerates the calcium-depleted resin. No precipitation of calcium sulfate occurs in the higher concentration of acid. Since a higher concentration of sulfuric acid can be used as regenerant acid, there will be a higher cation exchange resin regeneration efficiency.

OBJECTS OF THE INVENTION

It is the main object of this invention to provide a countercurrent ion exchange system for treating cation exchange resin with a high concentration of sulfuric acid.

It is another object of this invention to provide a method of regenerating a cation exchange resin with a high concentration of sulfuric acid in a continuous countercurrent ion exchange system.

It is still another object of this invention to provide an ion exchange system for the regeneration of cation exchange resin in the presence of calcium ion with sulfuric acid regenerant to prevent precipitation of calcium sulfate.

Other objects and advantages of this invention will becomes apparent from the following detailed description taken in connection with the accompanying drawing.

BRIEF DESCRIPTION OF THE DRAWING

The drawing represents a diagrammatic longitudinal sectional view of the regeneration tower or column of a countercurrent ion exchange system having an upflow of resin with a countercurrent downflow of regenerant, rinse water and dilution water.

DESCRIPTION OF THE PREFERRED EMBODIMENTS

In the drawing, 30 represents a tower or column of suitable construction and size. Column 30 is provided with inlet or feedpipes 10, 12 and 14 and outlet pipe 16 which open into or communicate with the interior of the column, however, with no restrictions as to the number of inlet and outlet pipes that may be required. Inside column 30 is cation exchange resin bed 28 in the particulate form. Column 30 has a resin inlet 18 and a resin outlet 20. Column 30 may be divided into three zones, 22, 24 and 26 which represent respectively a rinse zone, a regeneration zone and a dilution zone. Although there is no exact line of demarcation between zones 22, 24 and 26, they may be generally defined by the area defined by the walls of the column and the inlet and outlet pipes. For example, zone 22 is generally defined by the walls of the column, inlet pipes 14 and 12. Zone 24 is generally defined by the walls of the column, inlet pipe 12 and inlet pipe 10. Zone 26 is generally defined by the walls of the column, inlet pipe 10 and outlet pipe 16.

Although the drawing indicates an upflow of resin with a countercurrent downflow of rinse water, regenerant and dilution water, it is also possible to introduce the resin at the top of the column with the rinse, regenerant and dilution water passing toward the top of the column. This invention is also operable when the column is in the horizontal and inclined as well as the vertical positions.

Resin bed 28 may be any cation exchange resin, for example, a sulfonated, cross linked, styrene-divinylbenzene copolymer or any other cation exchange resin capable of existence in the calcium form, that is, having calcium ions on the exchangeable sites. The resin may be in any convenient shape including beads, granules and the like. The cation exchange resin enters column 30 at resin inlet 18 by means of a pulsing mechanism or any other suitable mechanism (not shown) used in the art to move resins in a countercurrent ion exchange system. Although the use of cation exchange resin in the calcium form is contemplated in the apparatus and method of this invention, it is possible to treat and regenerate cation exchange resins which are not in the calcium form. Cation exchange resins in the calcium form are those which have any amount of calcium ion on the exchangeable sites of the resin. The resin may also have sodium, magnesium and other cations attached to the exchangeable sites.

As the exhausted resin, that is, resin in which most exchangeable sites are occupied by ions removed from a solution, and the resin is no longer capable of effectively removing such ions from solution, enters resin inlet 18, it comes into contact with dilution zone 26. Dilution zone 26 contains dilute sulfuric acid which is 2 percent or less sulfuric acid and will not cause calcium sulfate to precipitate in the bed. Concentrations of sulfuric acid in excess of 1 percent by weight can cause precipitation of insoluble calcium sulfate when it interacts with a cation exchange resin in the calcium form depending on the concentration of calcium in the resin. Such precipitation is prevented by adding dilution water through inlet pipe 10 into the resin bed in the dilution zone. Dilution water injected at this point dilutes the sulfuric acid solution flowing from regeneration zone 24 and thereby dilutes the sulfuric acid to a 2 percent or less (by weight) concentration. The dilution water is distributed in dilution zone 26 through inlet pipe 10 by a suitable means (not shown) to uniformly distribute the water throughout the entire dilution zone area at a point downstream from inlet pipe 12 where sulfuric acid regenerant is injected. Inlet pipe 10 may be located at any point between inlet pipe 12 and outlet pipe 16, depending upon the type of water admitted to column 30 in inlet pipe 10. Outlet pipe 16 which is located at the bottom of column 30, that is, at the lower end of dilution zone 26, is an outlet for the combined liquid waste effluent of column 30. The combined waste effluent contains the rinse water, dilution water, spent sulfuric acid, the dissolved calcium sulfate and other waste products. Spent sulfuric acid regenerant is the sulfuric acid which remains after the cation exchange resin has been regenerated and after the calcium sulfate has formed, that is, it is unused sulfuric acid. Rinse water may be removed from the column through an outlet (not shown) located above inlet pipe 12.

As the cation exchange resin bed continuously or intermittently moves in column 30, it enters regeneration zone 24 where it is contacted with the higher concentration of sulfuric acid, that is, sulfuric acid in excess of 1 to 2 percent by weight, distributed in regeneration zone 24 through inlet pipe 12 by a suitable means (not shown). This more concentrated sulfuric acid is the sulfuric acid regenerant. The sulfuric acid regenerant is forced through the column in a direction opposite to the flow of the resin by the rinse water introduced through inlet pipe 14 into rinse zone 22. Normally, sulfuric acid regeneration in countercurrent ion exchange systems embraces sulfuric acid in concentrations ranging from 1 to 10 percent by weight. However, higher concentrations may be used as desired, depending upon the limits of the system. In view of the fact that additional dilution water is added to the column in this invention, concentrations of sulfuric acid in excess of 10 percent by weight are contemplated.

Cations which may includes but are not limited to sodium, magnesium and the remaining calcium ions, are removed from the exchangeable sites on the cation exchange resin in zone 24 and are replaced by hydrogen ions. Thus, the cation exchange resin is placed in the hydrogen form. The regenerated cation exchange resin in the hydrogen form continues its movement through column 30 countercurrent to the flow of the rinse water introduced through inlet pipe 14 into rinse zone 22 by a suitable means (not shown) where it is rinsed with water preferably having low amounts of sodium, magnesium, calcium and other ions which would replace the hydrogen ion on the regenerated cation exchange resin. The regenerated resin is rinsed at a point upstream from the sulfuric acid regenerant to remove residual sulfuric acid, and other residues from the resin. The resin bed 28 continues its countercurrent path to resin outlet 30 where it passes to other segments of the continuous countercurrent ion exchange system.

The regeneration or treatment column of this invention may be a unit in itself, that is, segregated from other parts of the system, or it may operate independently of any other entity. It may also be a segment of a more complete system wherein regeneration of the moving ion exchange resin bed as well as softening and/or deionization of a fluid are carried out.

There are no sharp lines of demarcation between the zones indicated in the regeneration column, and the limits as shown serve to illustrate the operation of the device.

Example

Cation exchange resin was completely exhausted with water having the following analysis:

| Ca } | 250 p.p.m. | $HCO_3$ | 55 p.p.m. |
|---|---|---|---|
| Mg } |  | $SO_4$ | 117 p.p.m. |
| Na | 71 p.p.m. | Cl | 149 p.p.m. |
| Total | 321 p.p.m. | Total | 321 p.p.m. |

Calcium and magnesium combined represent total hardness. Units are in parts per million p.p.m. calculated as calcium carbonate.

In a continuous countercurrent ion exchange apparatus, the cation exchange resin was moved through the column at a pulse cycle of 0.5 minutes, that is, additional quantities of exhausted resin were admitted into the column every ½ minute. The system contained a 2 inches diameter cellulose acetate butyrate regeneration column having an outlet pipe for waste at the base of the column, an inlet pipe for dilution water 5 feet above the outlet pipe, an inlet pipe for sulfuric acid regenerant 8 feet above the outlet pipe and an inlet pipe 20 feet above the outlet pipe for addition of rinse water. As the resin bed moved upward through the column, it was first met by a stream of dilution water flowing down through the column. A 2 percent sulfuric acid solution was admitted through the sulfuric acid regenerant feedpipe, and this acid was forced downward by the force of the rinse water admitted through the upper feedpipe. Sulfuric acid equivalent to 2.5 lbs. of 66Be (Baume) per cubic foot of resin to be treated was added to the system through the acid inlet pipe. There was no precipitate of calcium sulfate found in the resin bed. The waste material which passed from the outlet pipe located at the bottom of the column, contained 0.5 percent by weight of sulfates. The capacity of the regenerated cation exchange resin was 10.8 kgr/cu. ft.

Using the same water, apparatus and conditions set forth above a 5 percent sulfuric acid solution was admitted through the sulfuric acid regenerant feedpipe. No precipitate was found in the resin bed and the waste material which passed from the outlet pipe located at the bottom of the column, contained 0.75 percent by weight of sulfates.

In runs using an apparatus with no provision for the injection of dilution water precipitates formed in the bed when sulfuric acid having a concentration of both 2 percent and 5 percent was used as the regenerant in systems and under conditions otherwise identical with those used above.

In all instances, standard pumps and reservoirs were used to feed acid, rinse water and dilution water into the feedpipes.

The above experiments indicate that a higher concentration of sulfuric acid regenerant may be used to reconstitute an exhausted cation exchange resin in the presence of calcium ion without the precipitation of calcium sulfate when the method and apparatus of this invention are utilized.

It is to be understood that although the invention has been described with specific reference to particular embodiments thereof, it is not to be so limited, since changes and alterations therein may be made which are within the full intended scope of this invention as defined by the appended claims.

I claim:

1. A method of treating cation exchange resin in the calcium form with sulfuric acid regenerant in a column having in sequence a dilution zone, a regeneration zone, and a rinse zone, comprising:
   a. moving the cation exchange resin in the column;
   b. contacting the cation exchange resin with a countercurrent stream of sulfuric acid regenerant diluted with water in said dilution zone;
   c. contacting the cation exchange resin with a countercurrent stream of said sulfuric acid regenerant in said regeneration zone, said sulfuric acid regenerant passing into said dilution zone where it is diluted with water to form the dilute sulfuric acid of step (b); and
   d. COntacting the cation exchange resin with rinse water in said rinse zone to remove excess sulfuric acid from the resin.

2. A method of treating cation exchange resin with sulfuric acid in accordance with claim 1 wherein sulfuric acid regenerant having a concentration of at least about 1 percent by weight injected into the column is diluted to a concentration of less than about 1 percent by weight by injecting dilution water into the column at a point downstream from the injected sulfuric acid regenerant.

3. A method of regenerating cation exchange resin in the calcium form with sulfuric acid in an ion exchange column comprising:
   a. moving said resin through the column;
   b. injecting sulfuric acid regenerant into said moving resin;
   c. causing said sulfuric acid regenerant to move countercurrent to said resin;
   d. injecting water at a point downstream from said sulfuric acid regenerant to dilute said sulfuric acid; and
   e. causing said diluted sulfuric acid to move countercurrent to said resin whereby said resin is first treated with said dilute sulfuric acid to prevent precipitation of calcium sulfate by removal of a major amount of calcium ion in the form of soluble calcium sulfate from said resin, and said resin is subsequently treated with said sulfuric acid regenerant.

4. A method of regenerating cation exchange resin with sulfuric acid in accordance with claim 3 wherein the sulfuric acid regenerant has a concentration of at least about 1 percent by weight and the diluted sulfuric acid has a concentration of less than about 1 percent by weight.

5. A method of preventing precipitation of calcium sulfate during countercurrent regeneration of a cation exchange resin in the calcium form with sulfuric acid comprising diluting said acid to a concentration less than about 2 percent by weight with water at a point downstream from the point of acid introduction so that said moving resin first contacts said dilute acid and then contacts the more concentrated sulfuric acid, said dilute acid removing calcium in a soluble form prior to contacting said resin with said more concentrated acid.

* * * * *